June 1, 1954 E. W. EWESON 2,680,069
METHOD AND APPARATUS FOR MAKING ORGANIC FERTILIZER
Filed Oct. 31, 1950 4 Sheets-Sheet 3
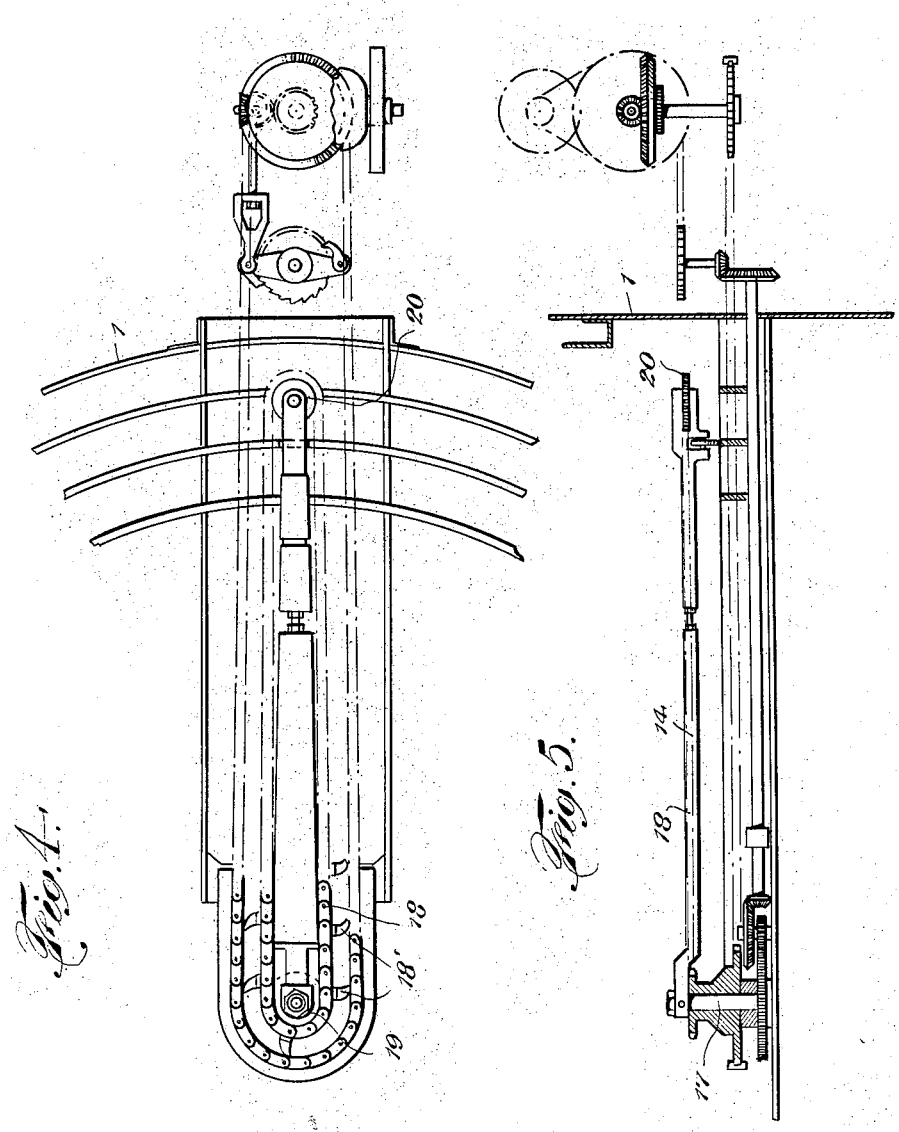
INVENTOR
Eric W. Eweson
BY
Emery, Varney, Whittemore & Dix
ATTORNEY

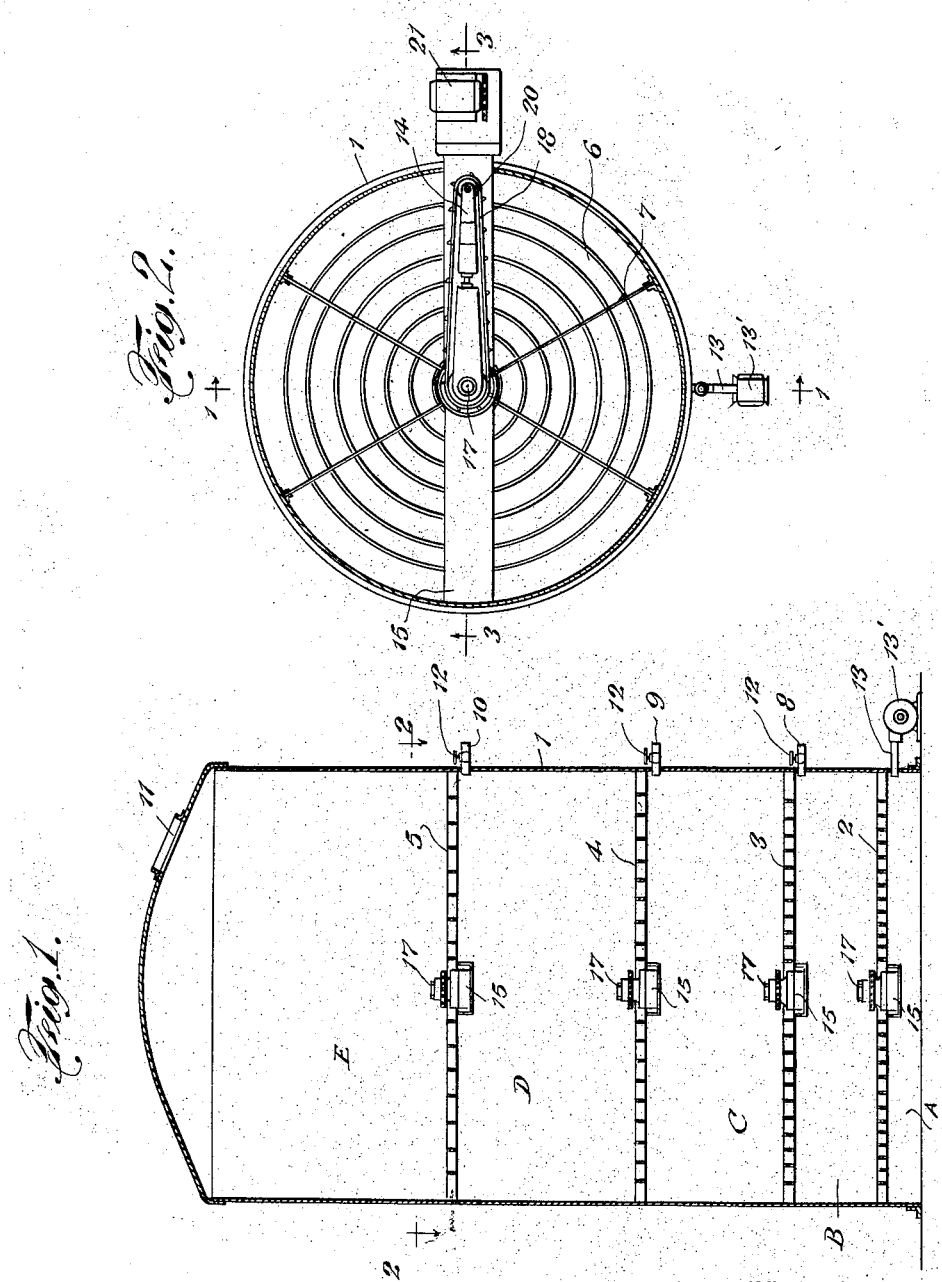

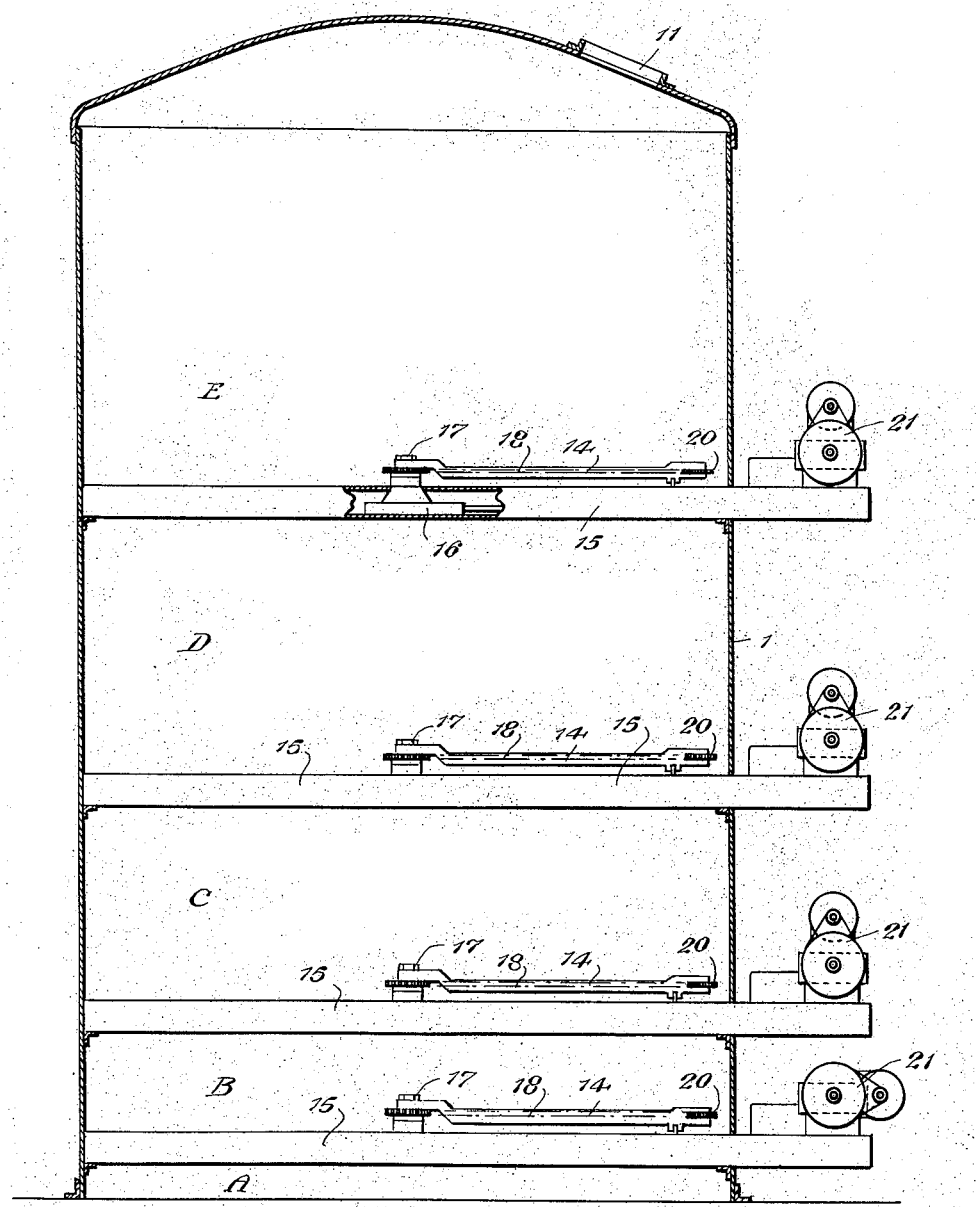

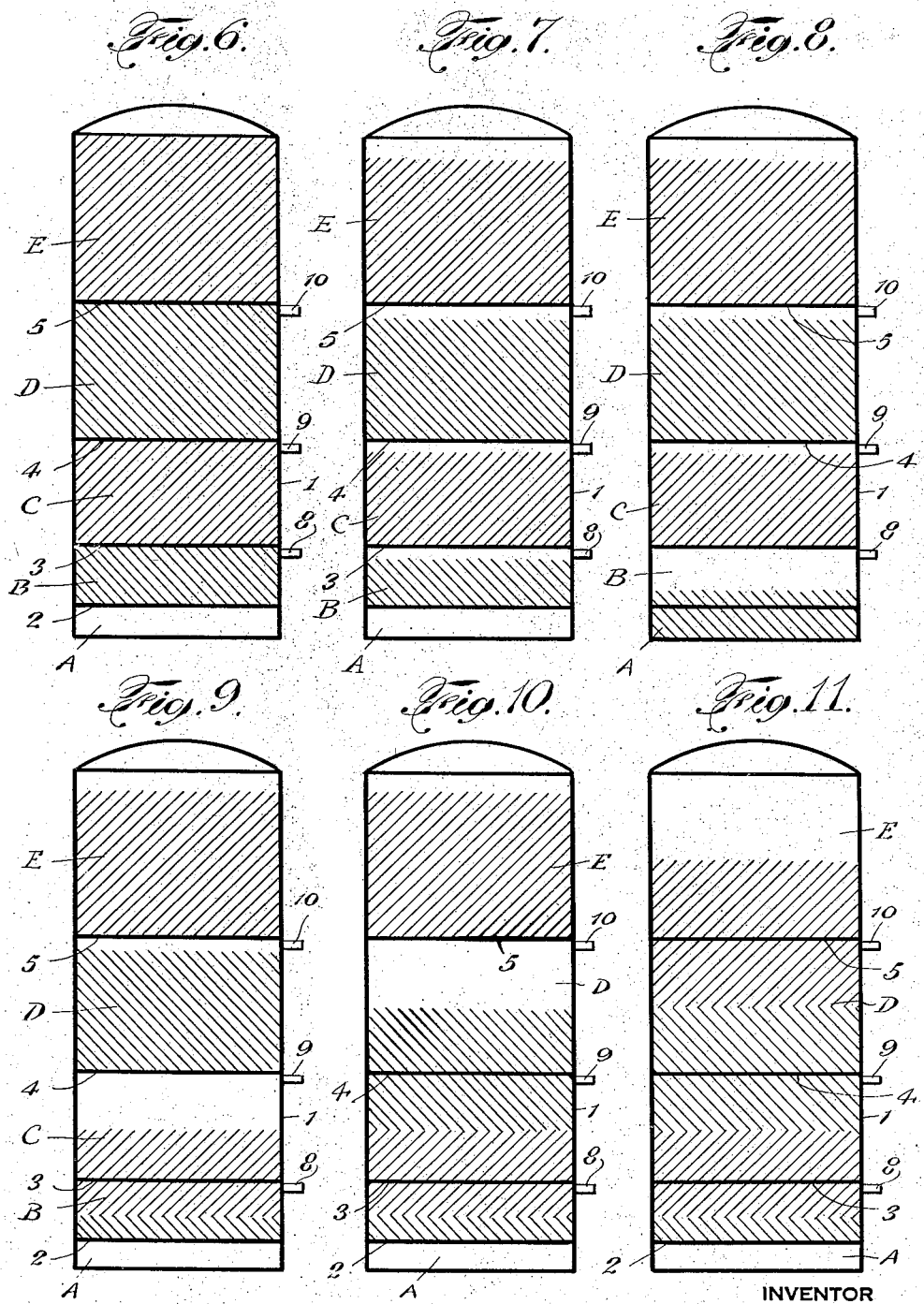

Patented June 1, 1954

2,680,069

UNITED STATES PATENT OFFICE 2,680,069

METHOD AND APPARATUS FOR MAKING ORGANIC FERTILIZER

Eric W. Eweson, Newport, R. I.

Application October 31, 1950, Serial No. 193,268

6 Claims. (Cl. 71—9)

This invention relates to methods and apparatus for making organic fertilizer.

In my prior Patent No. 2,474,833 I have described and claimed a method of making organic fertilizer by the decomposition of moist organic material through the propagation of aerobic bacteria therein in which air is forced through an enclosed mass of such material from the bottom thereof and spent air and generated gases are withdrawn at vertically spaced intervals throughout the mass.

It is an object of the present invention to provide an improved form of apparatus in which the aforesaid method may be practiced.

It is a further object of the invention to provide an improved method of making organic fertilizer which is fortified with mineral materials in forms which are readily available as plant nutrients.

Other objects and advantages of the invention will appear hereinafter.

A preferred embodiment of the invention selected for purposes of illustration is shown in the accompanying drawings, in which, Figure 1 is a vertical section through the apparatus on the line 1—1 of Figure 2.

Figure 2 is a horizontal section on the line 2—2 of Figure 1.

Figure 3 is an enlarged vertical section on the line 3—3 of Figure 2.

Figure 4 is a detail plan view of a rotating breaker arm.

Figure 5 is an elevation, partly in section of the same.

Figures 6 through 11 are diagrammatic views illustrating a complete cycle of operation.

Referring to the drawings, the apparatus comprises a tank 1, preferably cylindrical in shape, which said tank may be supported in any suitable manner.

Extending across the tank are a plurality of parallel, horizontally disposed grids 2, 3, 4, 5 each grid being preferably composed of a plurality of bars 6 in the form of spaced concentric rings held in position by radial bars 7. The bottom grid 2 is spaced a convenient distance above the bottom of the tank to provide a chamber A which serves as an air chamber through which air under pressure is distributed throughout the mass of material above, and also serves as a chamber in which the finished fertilizer is received from above and from which finished fertilizer may be removed from time to time in any suitable manner.

The grids 3, 4 and 5 are spaced above the grid 2 at increasing intervals, i. e. the space between grids 3, 4 is greater than that between grids 2, 3; the space between the grids 4, 5 is greater than that between grids 3, 4; and the space above grid 5 lying between grid 5 and the top of the tank is greater than the space between grids 4, 5.

The spacing between the bars of the grids should be such as to support the material in the chamber above while at the same time permitting free movement of air and gases from chamber to chamber. The new or partially treated material at the top of the tank is more cohesive and more easily supported than the more thoroughly treated material at the lower levels and the spacing between the concentric rings 6 is preferably decreased progressively toward the bottom of the tank so that the rings of the grid 2 are more closely spaced than those of grid 3, those of grid 3 are more closely spaced than those of grid 4, and those of grid 4 are more closely spaced than those of grid 5. For example, the rings of grid 2 may be spaced approximately 6" apart, those of grid 3 may be spaced approximately 8" apart, those of grid 4 approximately 10" apart and those of grid 5 approximately 12" apart.

Immediately beneath each of the grids 3, 4 and 5 is located one or more outlet pipes 8, 9, 10 and an outlet or hatch 11 may be located at the top of the tank, each of said outlet pipes except outlet 11 being provided with a valve 12 by means of which the volume of spent air and generated gases withdrawn at each level may be controlled. Outlet 11 is merely a vent to permit escape of any air and gases not withdrawn through pipes 8, 9 and 10.

An air inlet pipe 13 is located beneath the grid 2 through which air may be supplied to the chamber A, such air being supplied from a pump or blower 13' under pressure sufficient to force it upwardly through the mass of material in the tank.

Located immediately above each of the grids 2, 3, 4 and 5 is a breaker arm 14 which serves, as hereinafter explained, to break and loosen the material resting on the grids to allow it to drop through to the chamber immediately below. Said arms are supported on cross frames 15 extending transversely of the tank and having a gear box 16 containing a vertical shaft 17 which rotates the arm. Each arm carries a chain 18 which travels on sprockets 19, 20, the chains having teeth 18' which cut their way through the material as the arm rotates. Each arm and its respective chain is driven by a separate motor 21, located outside the tank through driving connections extending through the cross frame from the motor to the gear box 16. The details of said driving connections will not be described in detail since they form no part of the present invention.

The apparatus is intended to be operated continuously and a complete cycle of operation is illustrated diagrammatically in Figures 6 through 11 now referred to. Figure 6 represents the condition of the apparatus when fully charged and at the beginning of a cycle of operation. The finished material resulting from the last preceding cycle has been removed from the chamber A, the space E above the grid 5 has been filled with raw material which has been inoculated with the desired strains of aerobic bacteria, and this material and that contained within the spaces B, C and D above the grids 2, 3 and 4 is in process of treatment.

Within the space E above grid 5, the material at the bottom of the space which has been retained from the preceding cycle, is in an active stage of decomposition, and the newly added raw material at the top rapidly increases its rate of decomposition. Within the space D between the grids 4 and 5 decomposition proceeds at a still more rapid rate, and within the space C between grids 3 and 4 decomposition reaches its maximum development. The material lying in the space B between the grids 2 and 3 is nearing completion. Within this space propagation of aerobic bacteria and decomposition resulting therefrom is gradually declining, and the action which then takes place is primarily a drying action resulting from the absorption of moisture by the air passing through the material.

As decomposition proceeds, the material in each space shrinks and settles somewhat but the spacing of the rings of each grid is such that the material bridges the spaces between the rings, so that each grid supports the material above. As a result, as illustrated in Figure 7, a small space is formed above the material in each space and below the next higher grid through which air and gases may pass to the outlet pipes 8, 9 and 10. This condition, as illustrated in Figure 7, continues for the major portion of the cycle. Thus, assuming a 24 hour cycle, which I have found entirely practical in actual operation, the condition of Figure 7 might continue for say 20 to 21 hours, leaving 3 to 4 hours for performing the shifting operations now to be described.

In the first of these operations, the breaker arm 14 above the grid 2 is set into operation to break and loosen the material resting on grid 2 to drop some of the material into the chamber A, as illustrated in Figure 8, but preferably leaving a thin bed of material above the grid 2. The material dropped into the chamber A is finished fertilizer which may be removed from the chamber in any suitable manner for packing and shipment.

Next, the breaker arm above grid 3 is operated to break and loosen the material resting on grid 3 to fill the space B between grids 2 and 3, as illustrated in Figure 9. Similarly, the breaker arms above grids 3 and 4 are operated successively to fill successively the spaces C and D above grids 3 and 4 as illustrated in Figures 10 and 11. In each case, because the spaces are of decreasing capacity toward the bottom of the tank, each space can be filled from above while still retaining a bed of material on the grid above to receive the material which, in turn, is dropped on it. Finally the space E above grid 5 is filled with raw material to restore the condition of Figure 7.

During the operation of the apparatus, it is desirable that the flow of air be much more rapid through the lowest space where decomposition is complete or nearly complete than through the higher spaces where decomposition is active. For example, in an apparatus having a diameter of 14' and a height of 24' with a capacity of somewhat above 3000 cu. ft., I have found that excellent conditions of drying and decomposition may be maintained by introducing air through inlet pipe 13 at the rate of about 400 cu. ft. per minute and by withdrawing spent air and generated gases as follows: through pipe 8 at about 300 cu. ft. per minute, through pipe 9 at about 50 cu. ft. per minute, through pipe 10 at about 25 cu. ft. per minute, with a balance of the discharge through vent 11. Under these conditions the relatively large volume of air flowing through the space B between grids 2 and 3 will ordinarily reduce the moisture content of the material in that space sufficiently so that when discharged, the material is in condition for packing and shipment. If additional drying is required, the rate of air inflow may be increased and the rate of withdrawal through pipe 8 may be correspondingly increased without changing the rates of withdrawal through pipes 9, 10 or vent 11.

Within each of the spaces the development of aerobic bacteria and the decomposition resulting therefrom will generate carbon dioxide gas. In the space B between grids 2 and 3 only traces of carbon dioxide will be generated, but in the spaces C, D and E above where decomposition is proceeding more actively, larger quantities of carbon dioxide will be generated. This, together with the fact that some of the carbon dioxide generated in each of the lower spaces moves into the spaces above and is added to the carbon dioxide generated therein, produces a progressive increase in the concentration of carbon dioxide maintained in the upper spaces.

This fact may be availed of to utilize the apparatus for carrying out a method of making organic fertilizer which is heavily fortified with mineral materials in a form which is readily available as a plant nutrient, but which is not toxic or otherwise harmful to seeds, roots or plants or to earth-worms, bacteria or other micro-organisms found in the soil.

According to this method, a quantity of raw organic material such as sewage sludge, garbage or manure, for example, is mixed with a substantial quantity of crushed rock of a type required to supply the desired minerals, as for example, phosphate rock, limestone or feldspar or mixtures of these or other rock materials of any desired mineral content may be used. If desired, as much as one part of crushed rock to one part of organic material, by dry weight, may be used. The rock need not be finely ground, it being sufficient if crushed to pass through a 9 mesh screen. This mixture of organic material and crushed rock is then fed to the apparatus and subjected to the disintegrating cycle as preiously described. In this case the rate of withdrawal of air and gases through the outlet pipes is regulated in accordance with the concentration of carbon dioxide observed in the various spaces to maintain in those spaces certain ranges of concentration adequate to disintegrate the rock and convert it to a water soluble form while at the same time avoiding excessive concentrations which would retard the growth of aerobic bacteria. Thus the valves of outlet pipes 8, 9 and 10 are adjusted to maintain a carbon dioxide concentration of ½ to 4% in the space C between grids 3 and 4, a concentration of 4 to 7% in the space D between grids 4 and 5, and a concentration of 7 to 12% in the space E above grid 5. Due to the relatively large volume of flow of fresh air through space B between grids 2 and 3, the carbon dioxide content will be negligible.

It will be understood, of course, that the carbon dioxide combines with the moisture in the material to form carbonic acid and it appears that it is the acid which disintegrates and converts the rock material. The exact nature of the reactions is not completely understood, but the disintegration and conversion takes place rapidly and virtually completely for visual examination of the finished material reveals little or no trace of unconverted rock particles. It appears, moreover, that a considerable proportion of the mineral material is incorporated into microbial tissue in which form it is readily available as a plant nutrient, and in which form it is not toxic or otherwise harmful to seeds, roots or plants, or to the earthworms or bacteria of the soil.

If the rock materials are properly selected, the desired balance of the more important mineral nutrients such as phosphorus, potassium and calcium may be attained and at the same time smaller quantities of the so-called trace elements such as iron, magnesium, sulphur, cobalt, boron, manganese and others may also be incorporated.

It will be understood that the invention may be variously modified and embodied within the scope of the subjoined claims.

I claim as my invention:

1. Apparatus for making organic fertilizer comprising, a vertically disposed tank, a series of horizontally disposed grids extending across said tank at vertically spaced intervals and dividing said tank into a series of superimposed chambers, said grids being formed of horizontally spaced bars adapted to support organic material within said chambers while permitting free movement of air and gases from chamber to chamber, a breaker arm located immediately above each of said grids and movable along said grids to break and loosen material resting on said grids to cause the same to fall through said grids, an outlet pipe for the withdrawal of spent air and generated gases located immediately beneath each of said grids except the bottom grid of the series, a valve in each of said outlet pipes for controlling the rate of withdrawal therethrough, and an air inlet pipe beneath the bottom grid.

2. Apparatus as claimed in claim 1 in which said grids are spaced at increasing intervals toward the top of said tank.

3. Apparatus as claimed in claim 1 in which said grids are spaced at increasing intervals toward the top of the tank and in which the interval between the uppermost grid and the top of the tank is greater than the intervals between grids.

4. Apparatus as claimed in claim 1 in which the bars of said grids are spaced at decreasing intervals toward the bottom of the tank.

5. Apparatus as claimed in claim 1 including a vent pipe at the top of the tank above the uppermost chamber.

6. The method of making fortified organic fertilizer by the decomposition of moist organic material through the propagation of aerobic bacteria which comprises mixing crushed rock with organic material, forcing air under pressure through an enclosed mass of such material, all of said air being introduced into the mass from the bottom thereof, withdrawing spent air which has passed through the mass and gases including carbon dioxide gas generated within the mass at vertically spaced intervals throughout the mass, and controlling the withdrawal of said air and gases at said vertically spaced intervals to maintain a progressively increasing concentration of carbon dioxide from the bottom toward the top of the tank, the carbon dioxide content being maintained at not less than 7% within an upper section of the tank comprising not less than one third of the volume of the tank.

References Cited in the file of this patent

UNITED STATES PATENTS

| Number | Name | Date |
| --- | --- | --- |
| Re. 18,587 | Richards et al. | Aug. 30, 1932 |
| 1,260,103 | Wallace et al. | Mar. 19, 1918 |
| 1,863,109 | Graves | June 14, 1932 |
| 2,178,818 | Earp-Thomas | Nov. 7, 1939 |
| 2,474,833 | Eweson | July 5, 1949 |
| 2,639,902 | Kuebler | May 26, 1953 |